Oct. 3, 1950     R. E. VANDERHIDE     2,524,149
AUTOMATIC DRILLING MACHINE
Filed April 7, 1947     5 Sheets-Sheet 1

INVENTOR.
R. E. Vanderhide
BY Robb & Robb
Attorneys

Oct. 3, 1950 R. E. VANDERHIDE 2,524,149
AUTOMATIC DRILLING MACHINE
Filed April 7, 1947 5 Sheets-Sheet 2

INVENTOR.
R. E. Vanderhide
BY Robb & Robb
Attorneys

Oct. 3, 1950 R. E. VANDERHIDE 2,524,149
AUTOMATIC DRILLING MACHINE
Filed April 7, 1947 5 Sheets-Sheet 3

INVENTOR.
R. E. Vanderhide
BY
Robert Cobb
Attorneys

Oct. 3, 1950     R. E. VANDERHIDE     2,524,149
AUTOMATIC DRILLING MACHINE
Filed April 7, 1947                                     5 Sheets-Sheet 4
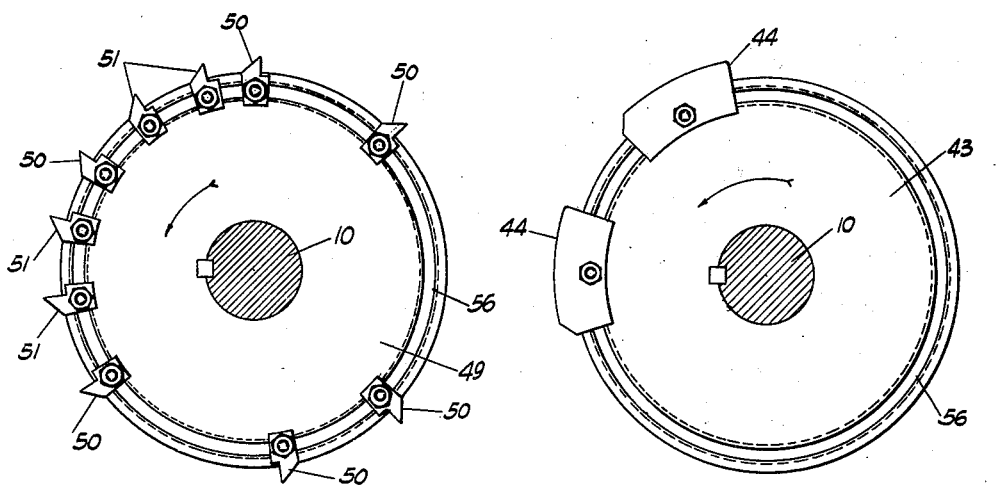
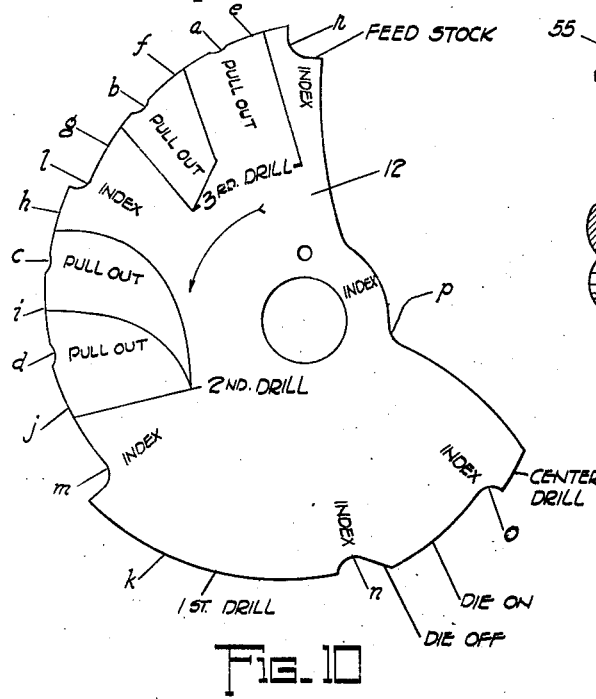
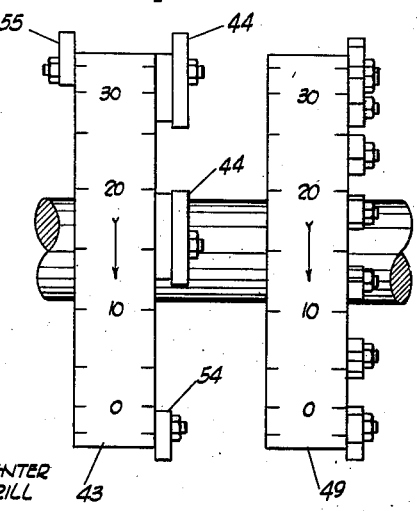
INVENTOR.
R. E. Vanderhide
BY
Attorneys Oct. 3, 1950   R. E. VANDERHIDE   2,524,149
AUTOMATIC DRILLING MACHINE
Filed April 7, 1947   5 Sheets-Sheet 5
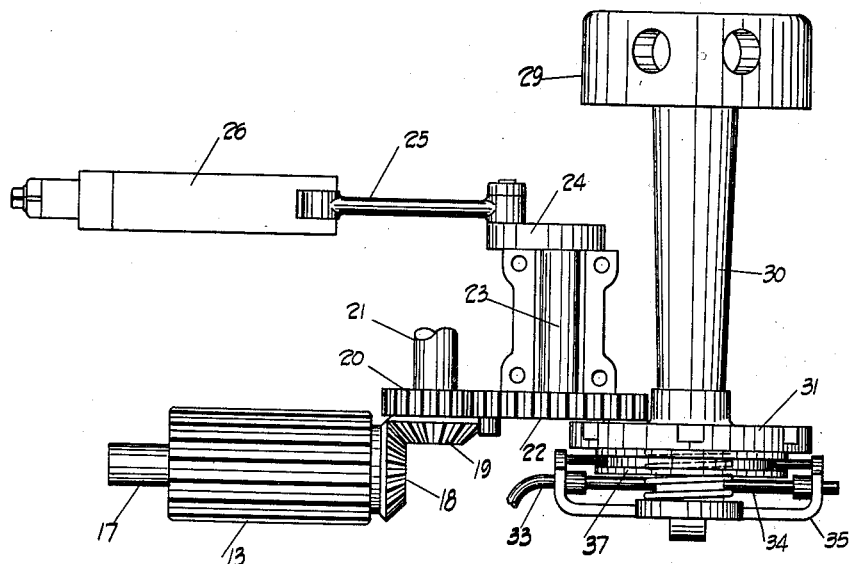
Fig. 12
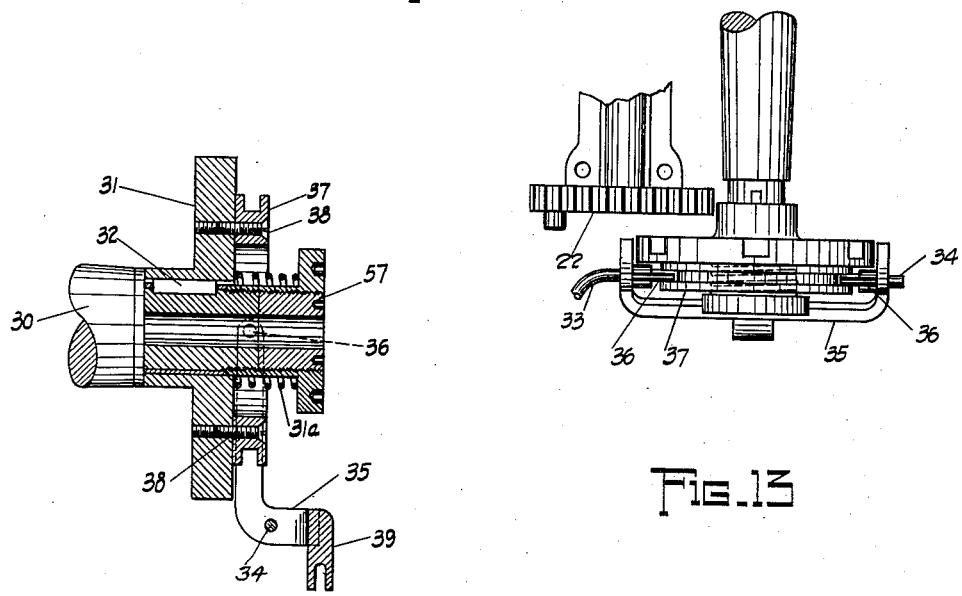
Fig. 14
Fig. 13
INVENTOR.
R. E. Vanderhide
BY Robb & Robb
Attorneys Patented Oct. 3, 1950

2,524,149

UNITED STATES PATENT OFFICE 2,524,149

AUTOMATIC DRILLING MACHINE

Robert E. Vanderhide, Cleveland Heights, Ohio

Application April 7, 1947, Serial No. 739,915

17 Claims. (Cl. 77—32)

This invention relates to the art of drilling machines, and primarily to improvements in the type of machine known as a Brown & Sharpe automatic screw machine in which a turret mounted on the customarily employed turret slide is equipped with appropriate tools adapted to be brought into consecutive operation for fashioning articles successively from bar stock.

My present invention embodies improvements in the above class of machine involving a further development of the invention of my United States application for patent Serial No. 586,475, filed April 4, 1945, now Patent Number 2,460,156, dated January 5, 1949, for Automatic Drilling Machine.

In the operation of automatic screw machines such as referred to above, for drilling purposes, the use of the drill requires that it be pulled out from the work periodically for cleaning, as by wiping off the chips or metal particles therefrom, at the same time oiling the drill itself. The pull-out operations in the turret type machine are ordinarily effected by the customary movement of the turret slide and turret under the control of a lead cam, said movement causing the withdrawal of the drill from the work during certain periods of the rotation of said lead cam. This method of drill withdrawal or pull-out slows down the drilling operations materially because of the requirement to bodily shift the turret slide and the turret under the control of cam recesses in the lead cam, the times of action of such parts causing a general wastage of time for completion of the drilling operation due to the relatively slow movement of said lead cam in controlling the drill pull-out action or actions. To exemplify the foregoing, it is notable that in respect to a job requiring 100 seconds to complete the drilling of a part, which involves a time factor of say substantially ten seconds per piece for the pull-out operations by movement of the turret slide and the turret, if the job involved a lot of 5000 pieces to be run, approximately 14 hours will be consumed for the pull-out operations alone, time that might be classed as wasted time.

It is therefore a primary object of my present invention, by the addition of relatively few attachment parts and controlling operating devices to the ordinary Brown & Sharpe type automatic screw machine, to effect the pull-out actions of the drill so as to save a major portion, in fact nearly the entire amount of the time mentioned as wasted in the example above given.

With the foregoing in view, I note that in the construction of automatic machines of the class to which my invention relates as above specified, there is commonly employed certain indexing mechanism by which the turret and turret slide are caused to move away from the work periodically, at the times when the turret is to be rotated to bring a fresh tool thereon into place for operating upon the work or bar stock. The operation of the indexing mechanism is well known to those versed in the art of these automatic machines and it is a primary object of my present invention to utilize, in what I believe to be a wholly novel manner, the present indexing movement of the turret slide and turret, without, however, effecting an indexing rotation of the turret itself, for accomplishing drill pull-out operations, that have heretofore depended upon the control action of relatively deep cam recesses in the lead cam of the machine. In other words, in the carrying out of my invention, I supply provisions attachable to an ordinary type of Brown & Sharpe automatic machine of the class stated, whereby the index wheel of the Geneva motion of such machine, used for turning or rotating the turret, is rendered inactive during the drilling operations controlled by the lead cam, thereby to prevent an indexing movement of the turret that would disturb the position of the drilling tool, while at the same time I supply other provisions controlled conjointly by the lead cam and by the turret slide operating gearing now used for causing the indexing movement of the turret slide and turret, for converting this indexing movement into drill pull-out movement for performing whatever number of drill pull-out actions are necessary in handling the particular job in the operation of the machine.

In the above connection it is notable that the withdrawal movement of the turret slide and turret that now takes place in these automatic machines under the control of the Geneva motion operating means, is a relatively quick movement which is performed usually in a fraction of a second, so that it will become evident, having in mind the foregoing, that the employment of said indexing movement of the turret slide and turret without any actual indexing rotation of the turret itself is of high advantage because of the saving of time involved in employing the sliding movement of the turret slide away from the work for each drill pull-out operation.

So far as I am advised, the use of the indexing movement of the turret slide and turret, independent of indexing rotation of the turret itself, as a means for effecting drill pull-out operations in a drilling operation of automatic machines of the type of my invention, has never been resorted to and the employment of provisions to the above end I claim to be a broadly novel phase and principle of my present invention in view of the time saving factors that are derived therefrom, not to mention the fact that the instrumentalities of my invention, generally speaking, do not make necessary any material change whatsoever in the construction of the turret slide, the turret thereon, and the drilling means or tool ordinarily attached to the turret.

To the extent outlined above, therefore, in so far as the mechanical instrumentalities utilized by me according to my present invention are employed in conjunction with the Brown & Sharpe automatic screw machine, I have simplified my mechanism which is embodied in my previous application for patent, notwithstanding that I still control the pull-out operations of the drilling tool incident to a combination action of certain drilling sections of the lead cam of the machine, and timing devices which effect or control directly the pull-out movements of said drilling tool in accordance with the broad principle of combined operation of certain parts of the machine of my previous application.

For purposes of illustration of my invention which will be understood more fully upon reference to the following detail description, I have shown my improvements hereinbefore summarized as they are applied to a common type of automatic screw machine of the manufacture of Brown & Sharpe Manufacturing Company, largely as generally shown and set forth in the United States Patent of Rich, No. 2,039,347, issued May 5, 1936, for Machine for Fashioning Articles Successively from Bar Stock, my machine as shown in my drawings being slightly modernized as compared with that of the Rich patent aforesaid though utilizing substantially the identical principles of construction in so far as the turret slide and indexing mechanism are concerned, these features and my lead cam construction being modified to accord with the present improvement provisions of my invention.

In the accompanying drawings:

Figure 8 is a view in side elevation of the indexing drum and the drill pull-out and indexing dogs which are carried thereby according to my present invention.

Figure 9 is a view similar to Figure 8 but showing the carrier drum dog used ordinarily for operating the feed clutch lever and deflector pan, same illustrated as equipped with operating cams of my invention for inactivating the indexing wheel of the Geneva motion.

Figure 10 is a side view of a lead cam of the novel construction of my invention, showing the so-called pull-out sections and recesses; also the indexing section of such cam.

Figure 11 is a view of the front cam shaft as equipped with the carrier drums having the pull-out and indexing dogs, and also the inactivating cams previously mentioned, said drums being separately illustrated by Figures 8 and 9.

Figure 12 is a top plan view showing generally the conventional Geneva motion mechanism for the operation of the turret slide and turret for indexing operation; the index wheel of the Geneva motion being shown with my novel throw-out devices by which this wheel is inactivated so as to permit the indexing movement of the turret slide and turret to be used for pull-out operations of the drill while the indexing wheel is inactive for prevention of the turning of the turret in such movement.

Figure 13 is a view similar to Figure 12 in respect to the devices cooperating with the index wheel of the Geneva motion for inactivating said wheel, this view showing the wheel in its outwardly moved adjustment wherein it is prevented from engagement of the pin gear of the Geneva motion.

Figure 14 is a vertical sectional view of the indexing wheel and its mounting sleeve on which it is adapted to slide outwardly and inwardly relatively to the pin gear; also the lever yoke for the shifting of the said wheel.

Figures 1, 2, 3:
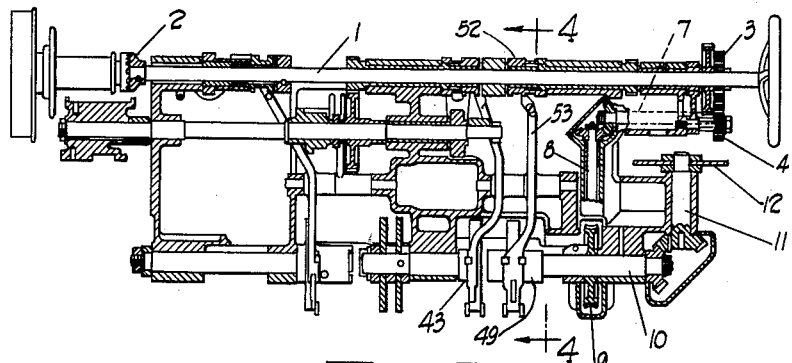
Figure 1 is a fragmentary view in elevation of a generally known type of the automatic machines above referred to, looking toward the machine from the side at which the turret slide and turret operating features are located.
Figure 2 is a fragmentary horizontal sectional view taken about on the line 2—2 of Figure 1 and bringing out certain details of the drive shaft, lead cam shaft, and clutch mechanism, as well as the drill pull-out control drums of my invention, more clearly.
Figure 3 is a vertical sectional view through the machine, bringing out primarily the mounting of the control drum or disc for inactivating the indexing wheel of the indexing mechanism, in relation to the pin gear that operates said wheel, features that are more clearly shown in Figure 6 of the drawings.

Describing generally the machine of the type previously referred to as suitable for application of my invention thereto, which machine as illustrated is largely a conventional #2G Brown & Sharpe automatic screw machine, Figure 1 of the drawings shows the machine looking toward the same from the rear side, so-called, and Figure 2 illustrates in horizontal section certain of the main and supplemental shaft members with the drive gearing and clutch arrangements. In Figures 1 and 2 the main drive shaft is designated 1 and this shaft is rendered operable by a main clutch 2, at will and in the usual way. The shaft 1 carries at its front end a gear 3 meshing with an adjustable idler gear 4 fixed to a similar gear 5, the latter in mesh with a driven gear 6 on a shaft 7 parallel with the shaft 1. The shaft 7 has the usual bevel gear connection to the worm and gear driving shaft 8 which drives the worm gearing including the worm gear 9 on the front carrier drum shaft 10 of the machine. The front shaft 10 is geared in the usual manner to the lead cam shaft 11 which carries the lead cam 12 seen best in Figure 2, which lead cam controls the feed movement of the turret slide and turret after known practice.

According to the foregoing method of gearing the front carrier drum shaft 10 to the main drive shaft 1, the shafts 10 and 11 turn at the same peripheral speed, so that a single revolution of the shaft 10 with its carrier drums will be effected coincident with a single revolution of the lead cam shaft 11.

As seen in Figure 1, the main drive shaft 1 is connected with the slide gear 13 on the turret slide 14 by means of the usual gears 15 and 16. The driving connections between the turret slide and the shaft 1 including the gear 13 just mentioned are best shown in Figures 1 and 12. These connections include the gear 13 on a shaft 17 mounted on the slide 14, said gear 13 having a bevel gear 18 in mesh with a bevel gear 19 integral with a spur gear 20 on a turret slide supported shaft 21. The spur gear 20 engages the pin gear 22 carried by the crank shaft 23 mounted in a suitable bearing on the turret slide and having the crank 24 connected by connecting rod 25 to the rack member 26, see Figures 5 and 12. The teeth of the rack 26, as usual, are engaged by the teeth of the lead cam follower lever 27 mounted in the frame of the machine and having the follower roll 28 that cooperates with the lead cam 12 mounted on the lead cam shaft 11 previously referred to. The turret 29 will be of conventional type, is carried by the turret shaft 30 supported in a suitable bearing in the turret slide 14 and on the end of the turret shaft 30 opposite the turret 29 is carried the index wheel 31. Ordinarily the index wheel 31 is attached to the shaft 30 for rotation with the shaft by means of a lock nut and is immovable in relation to the shaft. According to my invention, however, said index wheel 31, which is a part of the Geneva motion used for indexing the turret 29, is supported upon the main turret shaft 30 for sliding movement by the provision of a suitable key or spline connection 32. A keyway in the turret shaft 30 is now provided in such shaft for holding the index wheel 31 against rotation when said wheel is attached to the shaft by means of the lock nut customarily provided. The said key 32, according to my invention, acts as a spline to enable the outward sliding of the index wheel 31 on the shaft 30, and I make provision for moving the index wheel 31 endwise outwardly of the shaft 30 in the following manner, see Figures 12, 13, 14, and 6. On the turret slide 14, see Figure 6, I provide a bracket 33 having a pivot arm 34 providing an outboard bearing member adjacent to the outer side of the index wheel 31. On this pivot arm 34 I mount a crank shaped yoke 35, side arms of which are formed with actuating pins 36 that enter an annular groove in a throw-out collar 37 which is attached by screws or any suitable fastenings 38 to the outer side of the index wheel 31. The pivoted yoke 35 has a downward actuating pivot arm 39 the lower end of which is interlocked by a recess with the cross pin 40 of a bell crank lever 41 pivotally supported at the rear side of the machine by suitable brackets 42 which I attach to the frame of the machine in any suitable manner. It is notable that the bell crank lever 41 includes upper widely spaced arms and the cross actuating pin 40 is relatively long, this construction being necessary in order that the yoke lever 35 may move lengthwise of the machine with the turret slide while connected, of course with the throw-out collar 37 of the index wheel 31, notwithstanding that the lever 41 is stationary on the frame of the machine. For operating the parts 35 and 41 to control their movement in effecting endwise movement of the index wheel 31 of the Geneva motion I use the carrier drum 43 on the carrier drum shaft 10, which drum 43 may be the usual drum equipped with a cam to operate the deflector pan in the customary way. However, I mount on this cam drum 43, for the purposes of my invention, one or more cams, seen best in Figure 9 and designated 44, said cams, when adjusted and fixed, turning with the drum 43 and the shaft 10. The cams 44 are adapted to impinge against a roll 45 carried by the inner upwardly extending end of a rocker lever 46 which projects transversely across the machine from front to rear as seen best in Figures 3 and in Figure 6. The rocker lever is rockably mounted upon a bracket 47 which I attach to the machine frame in any suitable way, and its front end carries the roll 45 while its rear end is connected by a link 48 to the lower arm of the actuating bell crank 41.

On the cam drum shaft 10, in addition to the carrier drum 43 previously mentioned, there is mounted the usual indexing drum 49 which heretofore in the type of machines to which my invention may be applied has been used solely for indexing operation of the turret slide and turret, whereas according to my improved invention this drum 49 will be employed to perform a dual function, namely that just mentioned and the additional function of timing drill pull-out operations of the turret and its slide, independently of any indexing movement of the turret itself. With the foregoing in view, I have shown indexing drum 49 in Figures 8 and 11 in one of the constructions in which it may be embodied for the purposes of my invention. In Figure 8 the drum 49 is shown as equipped with six index dogs 50 and with four pull-out dogs 51, the functioning of which will be more fully set forth hereinafter.

Figure 4:
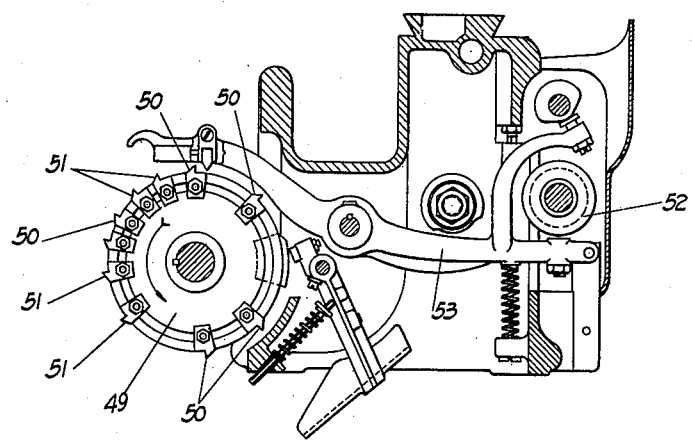
Figure 4 is a fragmentary sectional view through the machine, taken about on the line 4—4 of Figure 2.

The action of the drum 49 and the dogs thereon is employed for operating the index clutch 52 under the control of the lever 53, see Figures 2 and 4, each dog 50 or 51, see Figures 2, 4, and 8, being adapted to control clutch engaging actions of the clutch 52 for driving of the gears 15, 16, and 13 to operate the Geneva motion members comprising the pin gear 22 and indexing wheel 31 for indexing operations under control of the dogs 50. Clutch actuation of the indexing clutch 52 is also adapted to be effected by means of the dogs 51 during the turning of the drum 49 at times when the index wheel 31 of the Geneva motion is incapacitated for operation by the pin gear 22, as will be more fully presented hereinafter. The purpose of this is to use the dogs 51 for operation of the turret slide and turret for drill pull-out actions while the turret remains stationary against rotative movement on the slide though shiftable back and forth bodily with the latter.

In Figure 11 the hold-out cams 44 for the index wheel are shown to be spaced from the carrier drum 43 a sufficient distance to clear the deflector pan plunger pin which will be operated by the deflector pan operating cam 54 and in this figure the feed clutch lever operating dog 55 is located at the side of the drum 43 opposite that on which the parts 44 and 54 are disposed. The cams 44 and 54 and the dog 55 are adjustable annularly of the drum 43 in the usual annular hollow slots 56 that are provided in the opposite sides of each of the drums 43 and 49. In like manner, of course, the various index dogs 50 and the pull-out dogs 51 for effecting the pull-outs of the drill are connected adjustably in the slots 56 that are provided in opposite sides of the drum 49.

Figure 5:
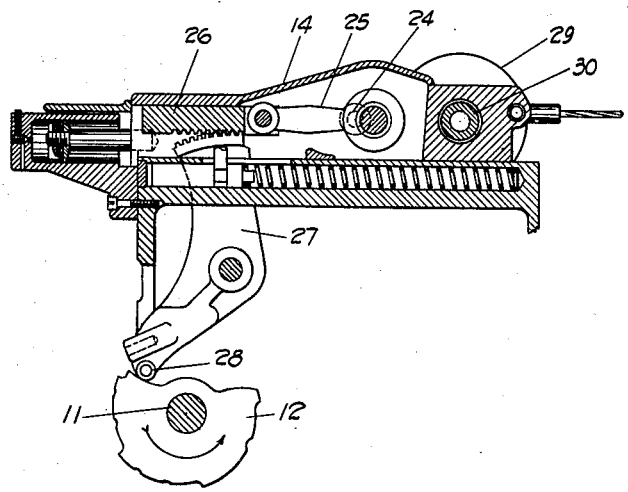
Figure 5 is a sectional view of the turret slide, turret, lead cam follower arm, and lead cam features of the turret slide unit.
Figure 6:
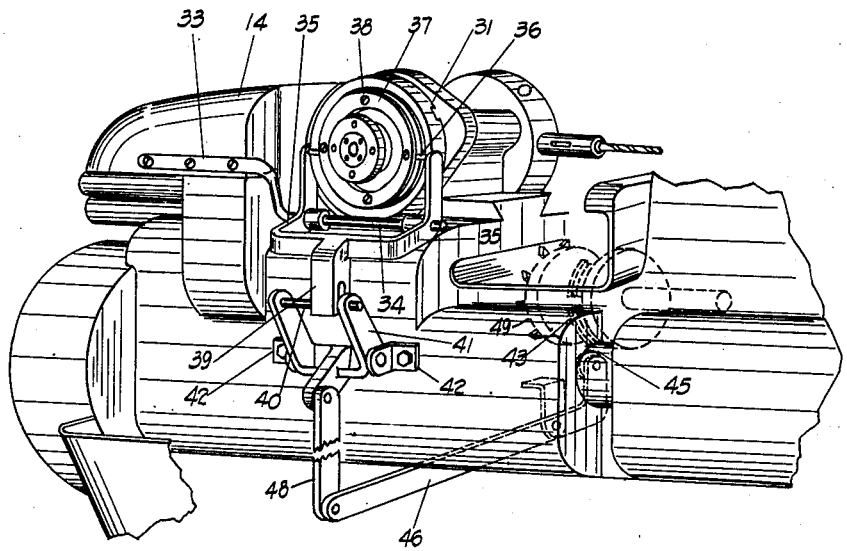
Figure 6 is a fragmentary perspective view showing the inactivating mechanism for the index wheel of the Geneva motion that controls the customary withdrawal movement of the turret slide and turret in the usual indexing operation.
Figure 7:
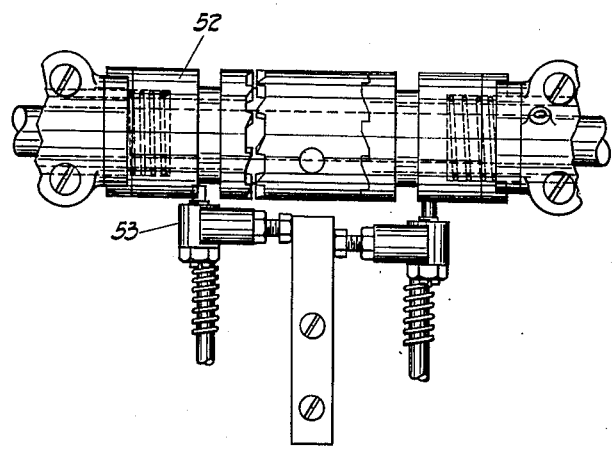
Figure 7 is a fragmentary view in elevation looking at the rear of the machine, showing certain of the clutch features illustrated in Figure 4, including primarily the indexing clutch.

I now refer to the construction of the lead cam for the purposes of my invention according to illustrations of the form of this cam as disclosed by Figures 5 and 10. It is well known that the lead cams are designed always dependent upon the nature of the work or the motions to be imparted to the shaping tools for turning, drilling, threading, knurling, or similar operations on the part to be produced. The construction of my lead cam as illustrated is to obtain a special design for the purpose of performing certain operations as will be more fully pointed out. Ordinarily, lead cams for automatic screw machines are designed to provide a series of lobes to impart working movement to the working tools of the turret, as each tool is indexed for operation. The lobes of the lead cam are, for all practical purposes, largely eccentric cams which act directly upon the lead cam follower lever and coact with the roll of the latter, operating the turret slide through the rack 26 previously described. The form of lead cam shown in Figure 10 and Figure 5 is a design of this member for performing certain indexing operations of the turret and for controlling certain drill reciprocating actions involving pull-outs of the drill at certain periods for cleaning and oiling. With the above in mind, and setting forth the specific form of the cam of Figure 10, said cam comprises what I term, for purposes of description, certain pull-out sections which are designated $a$, $b$, $c$, and $d$, at which points in the periphery of the cam are located recesses which act to receive the roll 28 of the arm 27 as the pulled out drill is caused to re-enter the hole being drilled, whereby to prevent the point of the drill from hitting the bottom of the opening being drilled in a manner that would cause damage to such point. As shown in Figure 10 also, the lead cam 12 at its periphery is provided with drill lobes $e$, $f$, $g$, $h$, $i$ and $j$; also a first acting drill lobe $k$. Cam 12 is likewise, as illustrated, formed with drop back recesses $l$, $m$, $n$, $o$, $p$, and $r$. The recess $r$ recedes also for stop feed action of the cam. It is to be understood that I have designed the cam 12 for illustrating the operation of my invention so that for the purpose of shaping the article which is to be produced by the machine in the use of the cam there will be employed on the turret, tools in order as follows—stock stop, center drill, die head, and three drills. The operation of the machine incident to the employment of the cam 12 and such assembly of tools will be shortly set forth, but it will be understood preliminarily that the turret slide and turret will be indexed six times in such operation and the indexing operations will include indexing the turret at certain times relatively to the pull-outs of the drills.

It is further to be understood that the six indexing dogs 50 are located on the drum 49 in positions which correspond with the location of the indexing recesses $r$, $l$, $m$, $n$, $o$ and $p$. Likewise, the pull-out dogs 51 are located in positions on the drum 49 directly related to and corresponding with the positions of pull-out recesses $a$, $b$, $c$ and $d$, see Figures 8 and 10. In other words, since the shaft 10 rotates at the same speed as the shaft 11, Figure 2, when the index dog at the very top of the drum 49 in Figure 8 acts upon the lever 53, the index recess $r$ of the cam 12, as shown in Figure 10, will cooperate with the roll 28 of the lead cam fulcrum arm 27. The foregoing roughly indicates how the various index and pull-out dogs are related to the various index and pull-out recesses of the lead cam 12. It is further to be understood in regard to the carrier drum 43 that the cams 44 are located in predetermined positions peripherally of the drum so that when the lead cam drilling lobes $e$, $f$, and $g$, and $h$, $i$ and $j$ are operating for the drilling operations, said cams 44 are acting upon the roll 45 of the cross lever 46, Figure 3, in order to maintain said lever in a position in which the index wheel 31 is moved outwardly away from the pin gear 22, so that when, under these conditions, a reciprocation is imparted to the turret slide and turret, the index wheel 31 of the Geneva motion that rotates the turret 29 is incapacitated or rendered inactive.

According to the novel provisions of my invention, the main parts which I use as attachment features to the ordinary automatic screw machine include primarily the cam parts on the carrier drum 43, the lever and index wheel throw-out connections between the lever 46 and the wheel 31, the use of what I call pull-out dogs 51 on the drum 49, and the special formation of the peripheral pull-out recesses in the lead cam element of the machine.

Having in view the foregoing description of the novel details of the automatic machine embodying my invention, the operation of the machine for a job such as may be performed by the use of a lead cam 12 of the design in Figure 10 may be set forth as follows:

The initial operation of the machine, after the set-up is completed, involves the rotation of the cam 12 and shaft and gearing parts in the customary manner. It is assumed that the cam 12 is in position with the stop recess $r$ acting on the roll 28 of the cam 12, at which time the turret is positioned ready for a stock feed-out. When the stock has been fed to the turret stop, after the usual manner of operation of these machines, the work collet or chucking mechanism then closes and the turret slide and turret move back while the forming tools on the cross slides perform their function. During the said operation of forming, the lead cam 12 is turning, and the index portion $p$ and the corresponding indexing dog 50 on the drum 49 cause the regular operation of indexing the first tool which is to go into action on the work. The center drill, having been indexed into position, then centers the work. The cam 12 continuing to turn, the turret 29 is then indexed for operation of a threading die by the index recess $o$, and, upon completion of the threading operation, the turret is again indexed by the action of the recess $n$ of cam 12 to bring into action the first drill on the turret. Now the drilling operation continues with this first drill along the drilling lobe $k$ up to the point or recess $m$ of the cam 12, at which time regular indexing of the turret brings the second drill into play, the same to be moved to the work by the drilling lobe $j$. Now at the time the drilling lobe $j$ comes into play, the lower cam 44 on the drum 43, Figure 9, acts upon the index wheel 31 to shift the latter away from the pin gear 22 and incapacitates said wheel for any rotative indexing operation of the turret 29. This condition of incapacitation of the wheel 31 continues during the drilling operations from the indexing point $m$ of the cam 12 nearly to the indexing point $l$ of the cam 12. It is desired during the drilling operation of the now operating drill from the indexing point $m$ to the indexing point $l$ to perform certain pull-out operations of the active drill for cleaning and oiling, and to do this work almost instantaneously so that substantially no time will be lost in the pull-out operations. Therefore, when the cam 12 has turned to the point of the pull-out recess d, the cam turning in the direction of the arrow of Figure 10, one of the pull-out dogs 51 will act upon the indexing clutch lever 53 to throw in the indexing clutch momentarily and cause a one-rotation spin of the long gear 13, thereby to effect a one-rotation turning of the crank arm 24 resulting in a pull-out movement of the turret slide and the turret thereon. During such pull-out movement, the index wheel 31 is inactive because it cannot be engaged by the pin on the pin gear 22, so that in the above manner I use the pull-out or ordinary indexing movement of the turret slide and turret independently of any indexing motion of the turret itself to effectuate the pull-out operation of the drill now working. The turning of the cam 12 continuing, a similar pull-out operation is performed when the roll 28 reaches the pull-out recess c. Thereafter the cam 44 becomes inactive in relation to the lever roll 45 permitting the index wheel 31 to move inwardly on its supporting shaft so that its indexing recesses may be engaged by the pin of the gear 22. A spring 31a on a collar 57 on the turret shaft 30, Figure 14, actuates the turret wheel 31, loaded inwardly, to move it toward the plane of the pin gear 22 as soon as the roll 45 of lever 46 escapes from cam 44 previously mentioned.

The continuing rotation of the cam 12 now brings into play the indexing recess l and the index dog 50 which is synchronized to act at the same time, whereby to index the third drill on the turret 29 for operation incident to the actuation of the clutch lever 53 and the index clutch 52, this operation being possible because the index wheel 31 is now in position for engagement by the pin of the gear 22 as in Figure 12. The third drill having been indexed, the lead cam 12 continues to rotate for drilling the work, and during this period the second index wheel inactivating cam 44 at the top of the drum 43, Figure 9, goes into action and the index wheel 31 is moved outwardly on the turret shaft 30 incapacitating it for operation of the turret, see Figure 13. The third drill now is continued to be fed into the work by the lobe g of the cam 12 until the roll 28 reaches the recess b, at which time the pull-out dog 51 of the drum 49, synchronized to act at this time, will cause the same pull-out operation as previously described, without any action of rotation of the turret 29 by the index wheel 31. According to the structure of the cam 12, Figure 10, and location of the dogs 51 on the drum 49 another pull-out operation of the drill, such as just mentioned, will take place when the roll 28 reaches the pull-out recess a. Then the drilling operation continues and the upper cam 44, Figure 9, moves sufficiently to reactivate the index wheel 31 or position it for cooperation with the pin gear 22, after which the roll 28 will reach the indexing recess r, and this completes the cycle of operation of the machine for the making of the part, shaped and drilled completely. It will be understood that this cycle continues for feeding stock, forming, threading, and drilling until the bar stock is consumed, whereupon the machine is re-loaded.

From the foregoing, it will be observed that I utilize the reciprocations of the turret slide and turret for performing both the indexing operation of the turret and the pull-out operations of the drill or drills carried by the turret, but in the latter operations my mechanism has inactivated the function of the index wheel to be turned by the pin gear of the Geneva motion so that in the pull-out operations there is no rotation of the turret, for reasons previously fully set forth.

Obviously, the design of the lead cam 12 may be varied according to the requirements of ordinary practice, dependent upon the number of the indexing movements and pull-out movements desired and required for the particular work, this being customary in ordinary practice, but my lead cam design eliminates the necessity of using deep pull-out drops and rises in the periphery of the cam, which is the time wasting factor incident to the pull-out operations of the ordinary type of automatic screw machines not equipped with the improvements of my invention.

The main objective in the utilization of the attachment parts which I employ is to enable me to avail of the operation of the crank arm 24 movement in order to produce the pull-out actions of the turret slide and turret, and it is obvious that various kinds of instrumentalities can be resorted to in order to accomplish the foregoing, so that I do not desire to be restricted to the detail forms and kinds of parts which I have described hereinbefore, as one adaptation of my invention, in carrying out the objectives thereof. The use of the pull-out recesses in the lead cam 12, as before indicated, is necessary in order that when a drill is reciprocally shifted forward into the opening of the work already partially drilled, the point of the drill will not hit the bottom of the hole and become injured by the metal-to-metal impact or impingement of the parts referred to. The pull-out recesses have abrupt rises to the feed lobes of the feed cam so that the drill point will be moved promptly into its cutting position after a pull-out operation has been performed.

I have illustrated in disclosing the practical utility of my invention a conventional type of machine such as previously identified, but, by the employment of modified attachment features, the principles of my invention may be incorporated in other types of machines wherein a turret and turret slide are reciprocated for indexing purposes, in order to avail of this reciprocating action for causing the pull-out operations of a drilling tool along the lines hereinbefore set forth.

It will be understood that on each pull-out action of the drill or drills on the turret 29, the drill is washed of all chips and cooled by the cutting oil after customary practice.

Having thus described my invention, what I claim as new and desire to secure by Letters Patent of the United States, is:

1. An automatic screw machine of the type comprising a turret slide and turret for holding work engaging tools, a drill mounted in the turret, indexing mechanism for effecting withdrawal and return movement of the turret and slide relatively to the work, and turret rotation, and a lead cam to effect feed movement of the turret and slide to the work, combined with first instrumentalities to incapacitate the turret rotating means, and second instrumentalities to cause the drill withdrawal and return movement of the slide and turret while the turret rotating means are incapacitated, for utilizing such withdrawal and and return movement by the indexing mechanism of the slide and turret solely for pull-out and return action of the drill.

2. An automatic screw machine of the type comprising a turret slide and turret for holding work engaging tools, a drill mounted in the turret, indexing mechanism including a carrier drum shaft for effecting withdrawal and return movement of the turret and slide relatively to the work, and turret rotation, and a lead cam to effect feed movement of the turret and slide to the work, combined with first instrumentalities to incapacitate the turret rotating means, and second instrumentalities including an actuating member operated by the carrier drum shaft to cause the withdrawal and return movement of the slide and turret while the turret rotating means are incapacitated, for utilizing such withdrawal and return movement by the indexing mechanism of the slide and turret solely for pull out and return action of the drill.

3. A combination machine as claimed in claim 1, in which the lead cam operates in synchronism with the indexing mechanism and has a pull-out recess on its feed portion located to prevent full return movement of the slide and turret immediately incident to the said pull-out and return action under control of the indexing mechanism, thereby to prevent the drill point from hitting the bottom of the hole being drilled as the feed action of the lead cam is resumed.

4. A combination machine as claimed in claim 2, in which the lead cam operates in synchronism with the indexing mechanism and has a pull out recess on its feed portion located to prevent full return movement of the slide and turret immediately incident to the said pull out and return action under control of the indexing mechanism, thereby to prevent the drill point from hitting the bottom of the hole being drilled as the feed action of the lead cam is resumed, said lead cam recess being rendered operable simultaneously with the operation of the said actuating member.

5. An automatic screw machine of the type comprising a turret slide and turret for holding work engaging tools, a drill mounted in the turret, indexing mechanism including a carrier drum shaft for effecting withdrawal and return movement of the turret and slide relatively to the work, and turret rotation, and a lead cam to effect feed movement of the turret and slide to the work, combined with first instrumentalities to incapacitate the turret rotating means, and second instrumentalities including an actuating member operated by the carrier drum shaft to cause the withdrawal and return movement of the slide and turret while the turret rotating means are incapacitated, for utilizing such withdrawal and return movement by the indexing mechanism of the slide and turret solely for pull out and return action of the drill, the said incapacitating instrumentalities including devices controlled from said carrier drum shaft.

6. A combination machine as claimed in claim 5, in which the lead cam operates in synchronism with the indexing mechanism and has a pull out recess on its feed portion located to prevent full return movement of the slide and turret immediately incident to the said pull out and return action under control of the indexing mechanism, thereby to prevent the drill point from hitting the bottom of the hole being drilled as the feed action of the lead cam is resumed.

7. An automatic screw machine of the type comprising a turret slide and turret for holding work engaging tools, a drill mounted in the turret, indexing mechanism for effecting withdrawal and return movement of the turret and slide relatively to the work, and turret rotation, and a lead cam to effect feed movement of the turret and slide to the work, said indexing mechanism including a carrier drum shaft, a carrier drum on said shaft, actuating members on the carrier drum shaft to operate the indexing means for back and forth indexing movement of the slide, and turning means for the turret operating normally in synchronism with the withdrawal and return movement of the slide and turret, and a shaft synchronized to move with the carrier drum shaft and carrying said lead cam, combined with means on the carrier drum shaft to incapacitate the turret turning movement during certain said withdrawal and return movement of the slide and turret, whereby the last mentioned movement of the slide and turret may be used for drill pull out action independently of any turret indexing action.

8. A machine as claimed in claim 7, in which the incapacitating means recited includes a part on the carrier drum shaft.

9. A machine as claimed in claim 7, in which the incapacitating means recited includes a part on the carrier drum shaft located on the latter shaft so that its movement is coordinated with that of a predetermined feed section of the lead cam.

10. A machine as claimed in claim 7, in which the incapacitating means recited includes a part on the carrier drum shaft located on the latter shaft so that its movement is coordinated with that of a predetermined feed section of the lead cam, said feed section of the lead cam having a recess by which the turret slide return movement is limited to prevent the point of an operating drill from hitting the bottom of a hole in process of being drilled.

11. A machine as claimed in claim 7, in which one of the actuating members of the carrier drum shaft is timed to operate the indexing slide and turret when the turret turning means is not incapacitated, thereby to effect tool indexing action of the turret at a predetermined time.

12. A machine as claimed in claim 7, in which one of the actuating members of the carrier drum shaft is timed to operate the indexing slide and turret when the turret turning means is not incapacitated, thereby to effect tool indexing action of the turret at a predetermined time, the remaining actuating members on the drum shaft being operable to cause the turret slide withdrawal and return movements when the turret turning means is incapacitated, said actuating members comprising dogs, said dogs being adjustably mounted on said drum.

13. A machine as claimed in claim 7, in which the incapacitating means comprises a drum on the drum shaft and a cam on said drum cooperable with the turning means for the turret included in the recited indexing mechanism.

14. A machine as claimed in claim 7, in which the incapacitating means comprises a drum on the drum shaft and a cam on said drum cooperable with the turning means for the turret included in the recited indexing mechanism, said cam being mounted on its drum so that during a period of rotation of the drum shaft it renders the turret turning means operable, and during another period of rotation of the drum shaft it incapacitates the turret turning means.

15. The combination with an automatic screw machine of the type comprising a turret slide and turret, indexing means for the turret including a mechanism to reciprocate the slide and simultaneously rotate the turret, and including a drum shaft having a moving member thereon to cause the actuation of said mechanism, of means on the drum shaft timed to incapacitate the turret rotating portion of said indexing mechanism, and one or more other members operable by said drum shaft also to cause the actuation of the indexing mechanism when the mentioned portion thereof is incapacitated.

16. A machine as claimed in claim 15, in which a drill is carried by the turret, in which a drum on the drum shaft adjustably carries the members referred to, and in which a drum on the drum shaft carries cam means forming a part of the incapacitating means set forth.

17. In an automatic machine of the class described, in combination, a turret slide, a turret on the slide for holding work engaging tools, indexing mechanism comprising means for effecting withdrawal and return movement of the said slide and turret, instrumentalities for rotating said turret, a lead cam for controlling feeding of the turret and its tools to the work, and formed with drill pull out sections, operating means for inactivating the turret rotating instrumentalities, and other operating means positioned in determined relation to the lead cam pull out sections for causing the withdrawal and return movement of the turret slide by the indexing mechanism while the turret rotating instrumentalities are inactive, whereby the last mentioned slide withdrawal movement may be utilized for drill pull out action of the slide and turret while the turret remains stationary against rotation.

ROBERT E. VANDERHIDE.

REFERENCES CITED

The following references are of record in the file of this patent:

UNITED STATES PATENTS

| Number | Name | Date |
| --- | --- | --- |
| 2,039,347 | Rich | May 5, 1936 |

FOREIGN PATENTS

| Number | Country | Date |
| --- | --- | --- |
| 95,551 | Germany | Jan. 5, 1898 |